US006807453B1

(12) United States Patent
Suzuki

(10) Patent No.: US 6,807,453 B1
(45) Date of Patent: Oct. 19, 2004

(54) METHOD AND SYSTEM FOR EVALUATING A DEFECTIVE RATIO OF PRODUCTS

(75) Inventor: Tatsuya Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/408,104

(22) Filed: Sep. 29, 1999

(30) Foreign Application Priority Data

Sep. 29, 1998 (JP) .......................................... 10-274544

(51) Int. Cl.$^7$ ........................................... G06F 19/00
(52) U.S. Cl. ........................ 700/110; 700/109; 702/84
(58) Field of Search ............................. 700/110, 95, 97, 700/121, 108–109, 117; 702/84, 181–182, 185; 438/14, 16

(56) References Cited

U.S. PATENT DOCUMENTS

| | | | |
|---|---|---|---|
| 5,452,218 A | | 9/1995 | Tucker et al. ................ 364/468 |
| 5,461,570 A | | 10/1995 | Wang et al. ................. 364/468 |
| 5,521,844 A | * | 5/1996 | Karis .......................... 702/185 |
| 5,539,652 A | * | 7/1996 | Tegethoff ..................... 703/14 |
| 5,541,846 A | | 7/1996 | Secrest ........................ 364/468 |
| 5,636,144 A | | 6/1997 | Kurtzberg et al. ........... 364/552 |
| 5,649,169 A | * | 7/1997 | Berezin et al. ................ 703/23 |
| 5,761,093 A | * | 6/1998 | Urbish et al. ............... 700/107 |
| 5,777,901 A | * | 7/1998 | Berezin et al. ................ 716/19 |
| 5,822,218 A | * | 10/1998 | Moosa et al. .................. 716/4 |
| 5,831,865 A | * | 11/1998 | Berezin et al. ................. 716/7 |
| 5,966,459 A | * | 10/1999 | Chen et al. .................. 382/149 |
| 6,072,574 A | * | 6/2000 | Zeimantz .................. 356/237.4 |
| 6,108,586 A | * | 8/2000 | Suzuki et al. ................ 700/117 |
| 6,338,001 B1 | * | 1/2002 | Steffan et al. ............... 700/121 |
| 6,373,566 B2 | * | 4/2002 | Zeimantz .................. 356/237.4 |

FOREIGN PATENT DOCUMENTS

| | | |
|---|---|---|
| EP | 99307633 | 9/2001 |
| JP | 10-334151 | 12/1998 |

OTHER PUBLICATIONS

"Close–up: The 1998 International Forum on DFMA", *Nikkei Mechanical*, No. 526, Jul. 1998, pp. 30–33 (in Japanese).

"Six Sigma and DFMA", *Nikkei Mechanical Seminar*, Jul. 15, 1998, pp. 8–10 and 27–28 (in Japanese).

* cited by examiner

*Primary Examiner*—Anthony Knight
*Assistant Examiner*—Ronald Hartman, Jr.
(74) *Attorney, Agent, or Firm*—Antonelli, Terry, Stout & Kraus, LLP

(57) ABSTRACT

A defective ratio evaluation method includes the steps of classifying defective information describing a design structure of a product and manufacturing features which become product defective occurrence factors and making the defective information accessible; comparing design information of a product to be evaluated with the defective information and computing types of defective information and a number of defective information items included in the design information; computing, before beginning manufacture of the product to be evaluated and using the types of defective information and the number of defective information items thus computed, a degree of occurrence of an event in which the product to be evaluated becomes defective; and displaying the degree of defective occurrence thus computed.

23 Claims, 14 Drawing Sheets

| No. | | DEFECTIVE EVENT | DEFECTIVE OCCURRENCE CONDITION (FACILITY, METHOD) | | | | DEFECTIVE OCCURRENCE CONDITION (STRUCTURAL FEATURES) | | | | | DEFECTIVE RATIO COEFFICIENT (ppm) |
|---|---|---|---|---|---|---|---|---|---|---|---|---|
| | | | SOLDERING METHOD | | SOLDER PASTE SUPPLY METHOD | | PART TYPE | SYMBOL | ARRANGE-MENT | SYMBOL | PART GAP K (mm) | |
| | | | FLOW | REFLOW | SCREEN | DISPENSER | | | | | | |
| 1 | 1 | INSUFFICIENT SOLDER (FLOW SOLDER, CHIP PART) | ○ | — | — | — | CHIP | t | MOUNT DIRECTION MATCHES SOLDER FLOW | h | — | 150 |
| | 2 | INSUFFICIENT SOLDER | — | ○ | ○ | — | IC | i | LAND CONTOUR AND SQUEEGEE DIRECTION | s | — | 100 |
| 2 | 1 | SOLDER BRIDGE (CHIP PART) | ○ | — | — | — | CHIP | t | — | | k<0.4 | 150 |

FIG. 2

- 100 — STORE DEFECTIVE INFORMATION IN WHICH CONDITIONS FOR OCCURRENCE OF DEFECTIVE EVENTS ARE DESCRIBED
- 110 — INPUT DESIGN INFORMATION OF PRODUCTS TO BE EVALUATED
- 120 — EVALUATE STRUCTURAL CONDITIONS OF EACH PART OF PRODUCTS TO BE EVALUATED
(FOR STRUCTURAL CONDITIONS OF EACH PART OF PRODUCTS TO BE EVALUATED, EXECUTE PROCESSING AS FOLLOWS: FOR EACH DEFECTIVE EVENT STORED, DETERMINE WHETHER OR NOT THE DEFECTIVE EVENT OCCURS UNDER THE STRUCTURAL CONDITION, CALCULATE ESTIMATION VALUE OF DEFECTIVE RATIO FOR THE DEFECTIVE EVENT, AND STORE THE DEFECTIVE EVENT AND THE ESTIMATION VALUE OF DEFECTIVE RATIO FOR THE DEFECTIVE EVENT)
- 130 — CALCULATE ESTIMATION VALUE OF DEFECTIVE RATIO FOR ENTIRE PRODUCT
- 140 — OUTPUT EVALUATION RESULTS

FIG. 3

| NO. | DEFECTIVE EVENT | STRUCTURAL CONDITION FOR OCCURRENCE OF DEFECTIVE EVENT |
|---|---|---|
| 1 | A | $a > b$ |
| 2 | B | $0° < c < 60°$ |
| 3 | C | ⋮ |
| ⋮ | ⋮ | |

DEFECTIVE INFORMATION

| NO. | OBJECT 1 | OBJECT 2 | STRUCTURAL CONDITION FOR OCCURRENCE OF DEFECTIVE EVENT |
|---|---|---|---|
| 1 | | | a>b |
| 2 | | | a>d, c=20° |
| 3 | | | e>b |
| ⋮ | ⋮ | ⋮ | ⋮ |

INPUT DESIGN INFORMATION

FIG. 6A

BOARD SPECIFICATIONS

| PRODUCT NO. | MP01 |
|---|---|
| PRODUCT NAME | MAIN BOARD ass'y |
| BOARD SIZE | 45 * 30 |
| MATERIAL NO. | G001 |
| BOARD MATERIAL | GLASS EPOXY |
| NUMBER OF BOARD LAYERS | 1 |
| SOLDER FLOW DIRECTION | X DIRECTION |
| SOLDERING METHOD | FLOW |
| ⋮ | ⋮ |

FIG. 6B

| | | | | | | | | | |
|---|---|---|---|---|---|---|---|---|---|
| INFORMATION OF JUNCTIONS | JUNCTION CONTOUR ON BOARD SIDE (PATTERN DESIGN INFORMATION:LAND, HOLE, LAND GAP, PART POSITIONING INFORMATION, PERIPHERAL PATTERN CONTOUR AND POSITION; PERIPHERAL DIVIDING POSITION, HOLE, NOTCH POSITION, ETC.) | MOUNT PART CONTOUR INFORMATION | OTHER CONTOURS | CONTOUR SIZE | | | | | |
| | | | JUNCTION CONTOUR ON PART SIDE | POSITIONING INFORMATION | POSITION DETERMINATION POINT | | | | |
| | | | | | REFERENCE POINT | | | | |
| | | | | NUMBER OF LEADS | | | | | |
| | | | | LEAD PITCH | | | | | |
| | | | | LEAD CONTOUR | | • | • | • | • |
| | | | MOUNT PART TYPE | | | IC | | | |
| | | LAND CONTOUR | LAND 1 | GAP BETWEEN PERIPHERAL PARTS AND LANDS | | 15,2.5 | 15 | 15,2.5 | 15,2.5 |
| | | | | LAND GAP | | 3.5 | 0.4 | 3.5 | 3.5 |
| | | | | NUMBER OF LANDS | | 2 | 8 | 2 | 2 |
| | | | | LAND PITCH | y DIRECTION | – | – | – | – |
| | | | | | x DIRECTION | 4 | 1.3 | 4 | 4 |
| | | | | LAND CONTOUR | Y WIDTH | 2.5 | 2.5 | 2.5 | 2.5 |
| | | | | | X WIDTH | 2.5 | 0.8 | 2.5 | 2.5 |
| | | | | REFERENCE POSITION COORDINATES | | (2,0) | (7,4) | (2,0) | (2,0) |
| | MOUNT PART ID | | | | | 251 | 262 | 251 | 251 |
| | POSITION (REFERENCE POSITION COORDINATES) | | | | | 33,5 | 11,7 | 33,10 | 33,14 |
| | JUNCTION NO. | | | | | 1 | 2 | 3 | 4 |

FIG. 7

| No. | | Defective Event | Defective Occurrence Condition (Facility, Method) | | | Defective Occurrence Condition (Structural Features) | | | | Defective Ratio Coefficient (ppm) |
|---|---|---|---|---|---|---|---|---|---|---|
| | | | Soldering Method | | Solder Paste Supply Method | Part Type | Symbol | Arrangement | Symbol | Part Gap K (mm) |
| | | | Flow | Reflow | Screen | Dispenser | | | | | |
| 1 | 1 | Insufficient solder (flow solder, chip part) | ○ | — | — | — | Chip | t | Mount direction matches solder flow | h | — | 150 |
| | 2 | Insufficient solder | — | ○ | ○ | — | IC | i | Land contour and squeegee direction | s | — | 100 |
| 2 | 1 | Solder bridge (chip part) | ○ | — | — | — | Chip | t | — | — | k<0.4 | 150 |

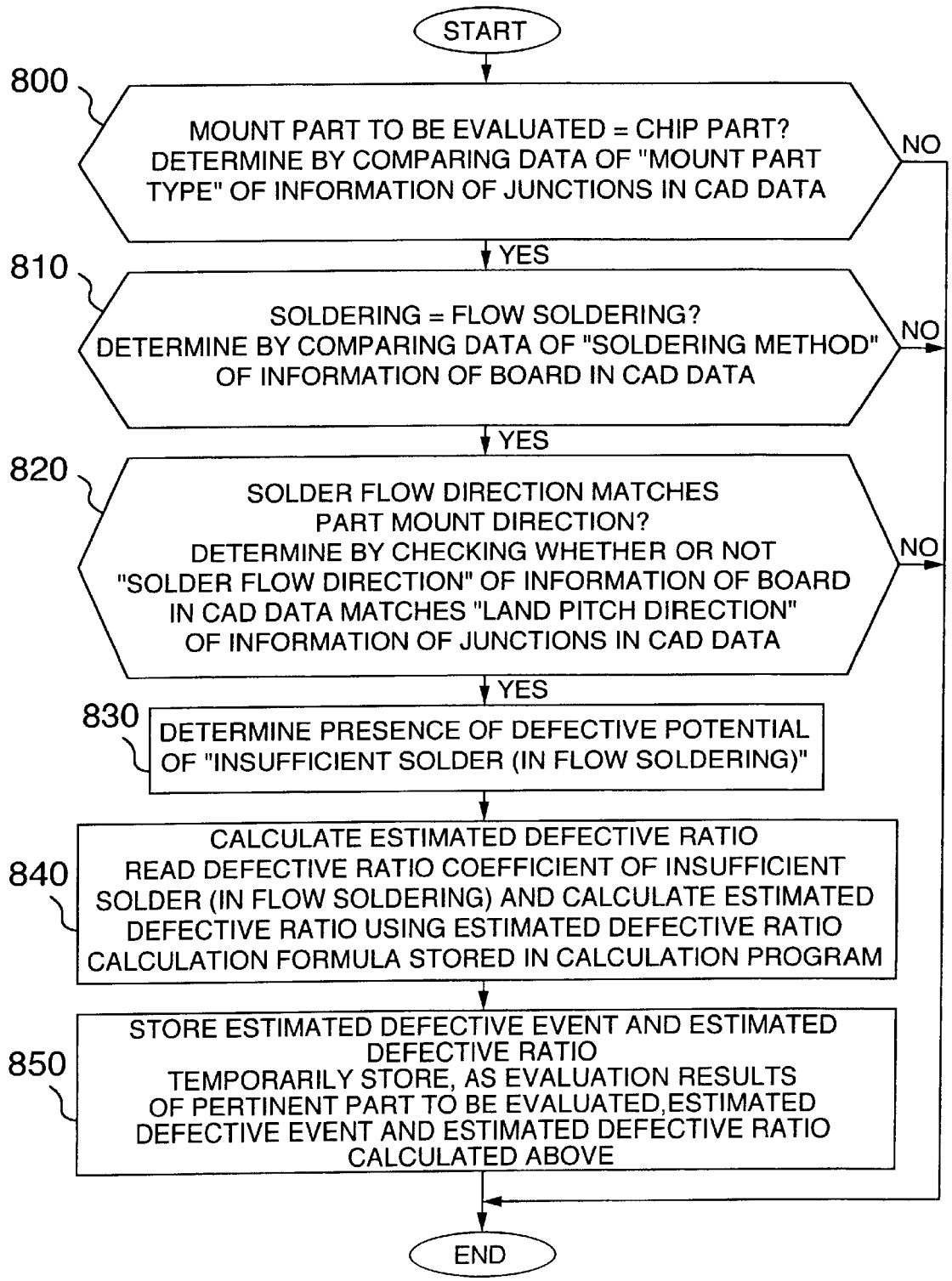

FIG. 9

310 — EVALUATION RESULTS OF ENTIRE PRODUCT

| BOARD Ass'y NAME | BOARD ID NO. | WORK PLACE | ESTIMATED DEFECTIVE RATIO (ppm) | ESTIMATED DEFECTIVE RATIO BY DEFECTIVE EVENT (ppm) | | | |
|---|---|---|---|---|---|---|---|
| | | | | INSUFFICIENT SOLDER | SOLDER BRIDGE | ⁓ | PART DE-STRUCTION |
| MAIN BOARD Ass'y | MP01 | A | 1300 | 450 | 800 | | 100 |

330 — EVALUATION RESULTS OF EACH PART

| PART NAME | PART ID NO. | CONSTI-TUTION ID NO. | ESTIMATED DEFECTIVE RATIO (ppm) | ESTIMATED DEFECTIVE RATIO BY DEFECTIVE EVENT (ppm) | | | |
|---|---|---|---|---|---|---|---|
| | | | | INSUFFICIENT SOLDER | SOLDER BRIDGE | ⁓ | PART DE-STRUCTION |
| IC-A | IC001 | 262 | 0 | — | — | | — |
| RESISTOR (CHIP PART) | R001 | 251 | 450 | — | — | | — |
| CONDENSER (CHIP PART) | C001 | 252 | 800 | — | — | | — |
| IC-B | IC002 | 261 | 100 | — | — | | — |

350

IC-A 262
GAP OF PARTS

RESISTOR (CHIP PART) 251
INSUFFICIENT SOLDER : 800 PPM
ADVICE (CHECK ITEMS)
• SOLDER FLOW DIRECTION
• PART DIRECTION

BOARD 201

CONDENSER (CHIP PART) 252
SOLDER BRIDGE : 450 PPM
ADVICE (CHECK ITEMS)
• PART MOUNT GAP
• PART MOUNT DEVICE POSITIONING PRECISION

PRESENT SOLDER FLOW DIRECTION ←

IC-B 261
PART DESTRUCTION : 100 PPM
ADVICE (CHECK ITEMS)
• PENETRATION TIME AND TEMPERATURE OF SOLDER LAYER
• PART DIRECTION

FIG. 11A

| PRODUCT NAME | SCREEN |
|---|---|
| PRODUCT NO. | 32786 |
| SOLDERING METHOD | COATED ARC WELDING |

FIG. 11B

| | | | |
|---|---|---|---|
| WELDING TYPE | | > | FILLET |
| WELDING POSITION | | VERTICAL | VERTICAL |
| JOINT TYPE | | BUTT | ⊢ |
| WELDING PARTS / WELDING PART 2 | CALIBER | – | – |
| | PART CONTOUR | (1300,0,0), (2600,0,0), (2600,0,1500), (1300,0,1500), (1300,9,0), (2600,9,0), (2600,9,1500), (1300,9,1500) | (1300,0,0), (2600,0,0), (2600,0,1500), (1300,0,1500), (1300,9,0), (2600,9,0), (2600,9,1500), (1300,9,1500) |
| | PART ID | 1002 | 1003 |
| WELDING PARTS / WELDING PART 1 | PLATE THICKNESS | 9 | 9 |
| | CALIBER | – | – |
| | PART CONTOUR | (0,0,0), (1300,0,0), (1300,0,1500), (0,0,1500), (0,9,0), (1300,9,0), (1300,9,1500), (0,9,1500) | (0,0,0), (1300,0,0), (1300,0,1500), (0,0,1500), (0,9,0), (1300,9,0), (1300,9,1500), (0,9,1500) |
| | PART ID | 1001 | 1001 |
| INCLUDED ANGLE CONTOUR | ROOT GAP | 1.0 | – |
| | INCLUDED ANGLE | 50° | – |
| WELDING RANGE (POSITION COORDINATES) | | (1300,9,0), (1300,9,1500) | (2300,9,0), (2300,9,800) |
| WELDING LOCATION NO. | | 1 | 2 |

FIG. 12A

| NO. | DEFECTIVE EVENT | DEFECTIVE OCCURRENCE CONDITIONS (STRUCTURAL FEATURES) | | | | | | | | DEFECTIVE RATIO COEFFICIENT CALCULATION FORMULA OR DEFECTIVE RATIO COEFFICIENT (ppm) | |
|---|---|---|---|---|---|---|---|---|---|---|---|
| | | JOINT TYPE | | | WELDING TYPE | | WELDING POSITION | | INCLUDED ANGLE CONTOUR | | g1 (PLATE THICKNESS, ROOT GAP) |
| | | BUTT | T | LAP | V SHAPE | FILLET | VERTICAL | DOWNHAND WELDING | INCLUDED ANGLE | ROOT GAP | |
| 1 | SLAG INCLUSION | ○ | — | — | ○ | — | ○ | — | 60° OR LESS | (TO ADDRESS B) | 300 |
| 2 | INCOMPLETE PENETRATION | — | ○ | — | — | ○ | ○ | — | — | — | |

FIG. 12B

ADDRESS B

| PLATE THICKNESS (mm) | ROOT GAP (mm) |
|---|---|
| 4.5 | r<0.9 |
| 6 | r<0.9 |
| 9 | r<1.4 |
| 16 | |

FIG. 14

ESTIMATION RESULTS OF DEFECTIVE RATIO

510 — ENTIRE PRODUCT

| PRODUCT NAME | SCREEN | PRODUCT NO. | 32786 | WORK PLACE | A | WELDING METHOD | COATED ARC WELDING |
|---|---|---|---|---|---|---|---|

511 —

| ESTIMATED DEFECTIVE RATIO OF PRODUCT (ppm) | RATIO BY EVENT | SLAG INCLUSION | 240 | | |
|---|---|---|---|---|---|
| 540 | | INCOMPLETE PENETRATION | 300 | | |

512

530 — RESULTS BY WELDING POSITION

531 — INPUT INFORMATION / 532 / 531a OUTPUT INFORMATION

| ANGLE | WELDING LOCATION GAP | WELDING PART NO. | | JOINT TYPE | WELDING TYPE | WELDING POSITION | INCLUDED ANGLE CONTOUR | | WELDING LENGTH | ESTIMATED DEFECTIVE EVENT | DEFECTIVE RATIO COEFFICIENT (ppm) | ESTIMATED DEFECTIVE RATIO (ppm) |
|---|---|---|---|---|---|---|---|---|---|---|---|---|
| | | | | | | | INCLUDED ANGLE | ROOT | | | | |
| 1 | WELD ZONE ① | 1001 | 1002 | BUTT | V SHAPE | VERTICAL | 50 | 1.0 | 1500 | SLAG INCLUSION | 200 | 240 |
| 2 | WELD ZONE ② | 1002 | 1003 | T-JOINT | FILLET | VERTICAL | — | — | 800 | INCOMPLETE PENETRATION | 300 | 300 |

533  531b 531c

550

1001 — 1002
1003

WELD ZONE ① SLAG INCLUSION

WELD ZONE ② INCOMPLETE PENETRATION

RECORDING MEDIA LAYOUT

METHOD AND SYSTEM FOR EVALUATING
A DEFECTIVE RATIO OF PRODUCTS

BACKGROUND OF THE INVENTION

The present invention relates to a method of and a system for evaluating a defective ratio in which easiness of occurrence of defects in products is evaluated before the products are manufactured.

As a known example to evaluate easiness of defective occurrence in products before manufacturing thereof, there has been reported, for example, a technology in which a defective ratio of the completed article, i.e., the entire product is estimated in accordance with the number of assembly work steps and the number of assembly parts using an average process capacity value and an average part defective ratio.

Examples of the conventional technology are described in "Close-up: The 1998 International Forum on DFMA", *Nikkei Mechanical*, No. 526, July 1998, pp. 30–33; "Six Sigma and DFMA", *Nikkei Mechanical Seminar*, Jul. 15, 1998, pp. 8–10 and 27–28; and JP-A-10-334151.

However, in either conventional examples, since the product defective ratio is evaluated by paying attention to assembly of parts constituting each product, a defective ratio of the product cannot be fully evaluated depending on cases when a cause of defects is included in design structure itself. For example, in evaluation of work such as soldering or welding, a defective event is apt to appear due to design structure. Therefore, for a product for which a plurality of types of defective events exist due to such design structure, the conventional defective ratio evaluation achieved by mainly paying attention to the assembly work cannot easily check all defective events and it is difficult to reflect the defective events in the evaluation.

SUMMARY OF THE INVENTION

It is therefore an object of the present invention, which has been devised to solve the conventional problem above, to provide an evaluation method and an evaluation system suitable to evaluate products for which a plurality of types of defective events exist.

To achieve the object above in accordance with the present invention, there is provided a method including a step of classifying defective information describing features of product design structure causing occurrence of product defects and storing classified information, a step of comparing design information of products to be evaluated with the defective information and calculating types and the number of defective information items included in the design information, and a step of calculating, by use of the types and the number of defective information items thus calculated, a degree in which the product becomes defective.

In addition, there is provided a system including a storage unit for classifying defective information describing features of a product design structure causing occurrence of product defects and for storing information classified, an input unit for inputting design information of products to be evaluated, and a calculating unit for comparing the design information inputted by the input unit with the defective information stored in the storage unit, for calculating types and the number of defective information items included in the design information, and for calculating, by use of the types and the number of defective information items thus calculated, a degree in which the product becomes defective.

By evaluating mainly the defective events above, it is possible to provide sufficient evaluation for products for which a plurality of types of defective events exist. Since the defective events are particularly evaluated in association with the product structure, the evaluation results directly influence quality of the product structure and hence are suitable as measures to determine necessity of design modification or correction. Additionally, the product structure related to defective events is stipulated by design information between parts and between structural conditions such as mount conditions. Therefore, it is possible to increase a chance or probability of occurrence of defective events regarding the product structure stipulated, which increases reliability of the evaluation itself.

In accordance with the present invention, there is provided an evaluation method and an evaluation system suitable to evaluate products for which a plurality of types of defective events exist.

BRIEF DESCRIPTION OF THE DRAWINGS

The objects and features of the present invention will become more apparent from the consideration of the following detailed description taken in conjunction with the accompanying drawings in which:

FIG. 2 is a flowchart showing a processing flow in the system of the present invention;

FIG. 3 is a diagram showing defective information of the present invention;

FIGS. 6A and 6B are diagrams showing input design information of the present invention;

FIG. 7 is a diagram showing defective information of the present invention;

FIG. 8 is a flowchart showing a processing flow in the system of the present invention;

FIG. 9 is a diagram showing an example of an output screen in the system of the present invention;

FIGS. 11A and 11B are diagrams showing input design information of the present invention;

FIGS. 12A and 12B are diagrams showing defective information of the present invention;

FIG. 14 is a diagram showing an example of an output screen in the system of the present invention;

DESCRIPTION OF THE EMBODIMENTS

Figure 1:
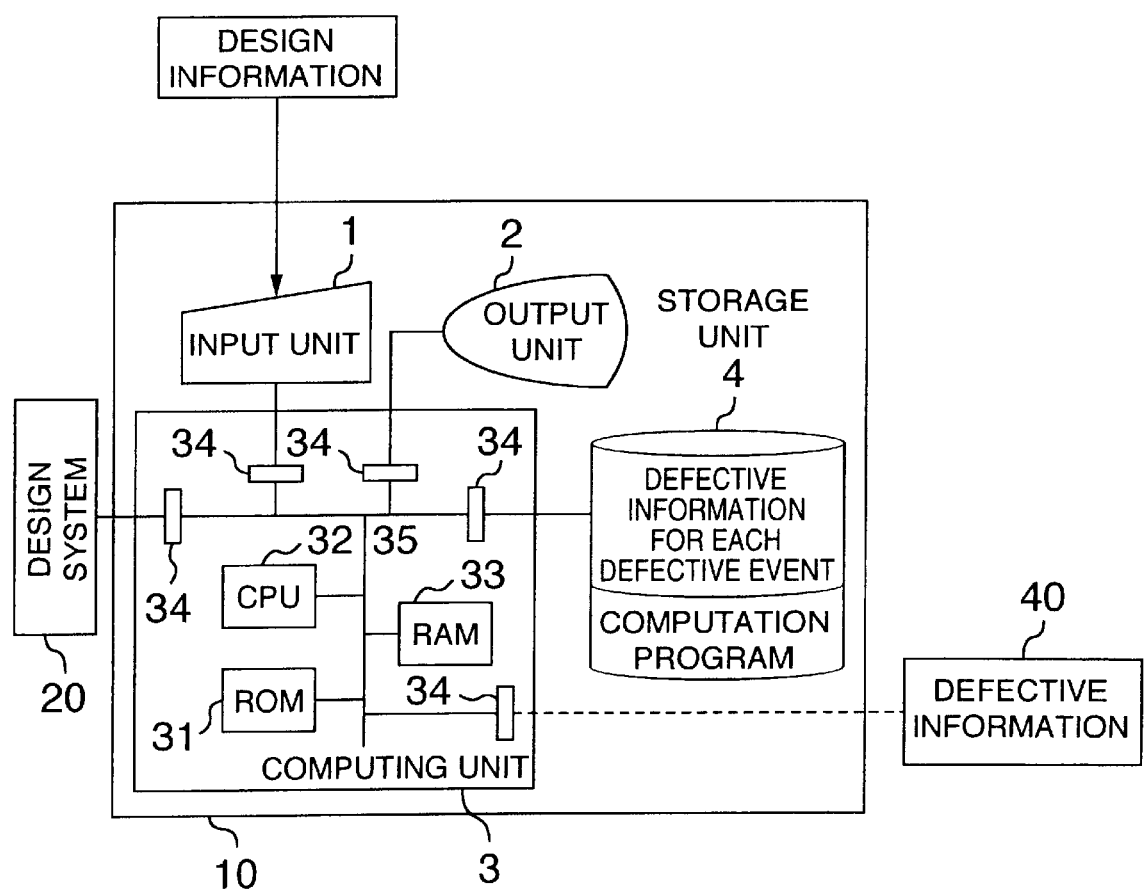
FIG. 1 is a diagram showing a configuration of an embodiment of a system in accordance with the present invention.

Referring now to the drawings, description will be given in detail of the present invention.

FIG. 1 shows an outline of a defective ratio evaluation system to evaluate a defective ratio.

In this system, from a design structure of products to be evaluated, structural defective occurrence conditions which may become defective factors are extracted such that defective events and defective ratios of the product are evaluated to be outputted in accordance with types of and the number of the structural defective occurrence conditions thus extracted.

The system shown in FIG. 1 primarily includes a defective ratio evaluation system 10 to evaluate defective ratios and a design system 20 to input design information of products to be evaluated by evaluation system 10. However, when the design information of products to be evaluated is directly inputted to evaluation system 10, design system 20 is not required.

In the configuration, evaluation system 10 includes an input unit 1 including a keyboard, a mouse, a pen-input tablet, a recording media, an input unit via a network, and the like; an output unit 2 including a display unit such as a display monitor, a print unit, and an output unit via a network to another system; a computation unit 3 to execute processing of evaluation of the present invention, and a storage unit (an external storage) 4 to store various information to evaluate defective ratios. Incidentally, computation unit 3 includes a central processing unit (CPU) 32, a read-only memory (ROM) 31 in which predetermined programs are stored, a random access memory (RAM) 33 to temporarily store various data, an input/output interface 34, a bus line 35, and the like. The defective information may be inputted from an external device. A reference numeral 40 indicates defective information external arranged.

On the other hand, design system 20 includes a two-dimensional computer aided design (CAD) system, a three-dimensional computer aided design (CAD) system, and the like to input design information of products to be evaluated.

Next, FIG. 2 shows processing for a defective ratio evaluation in the system. The flow of FIG. 2 can be supplied via a computer-readable recording media.

First, there is stored in storage unit 4 defective information including description of structural or manufacturing conditions for the plural types of defective events, the defective events occurring under the conditions (step 100).

FIG. 3 shows defective information stored in storage unit 4 in which for each event, a structural defective occurrence condition under which there is a fear of occurrence of the defective event is described. The structural defective occurrence condition is information regarding the structure such as size, an angle, weight, a contour, and a layout. A defective event is identified in accordance with structural defective occurrence conditions between parts and/or between members. For example, it is a ratio of a size of part A to that of part B or an angle between members A and B. The defective event can be naturally identified according to structural conditions of a single part or member.

Subsequently, design information of products to be evaluated is inputted via design system 20 or input unit 1 (step 110).

Figures 4, 5:
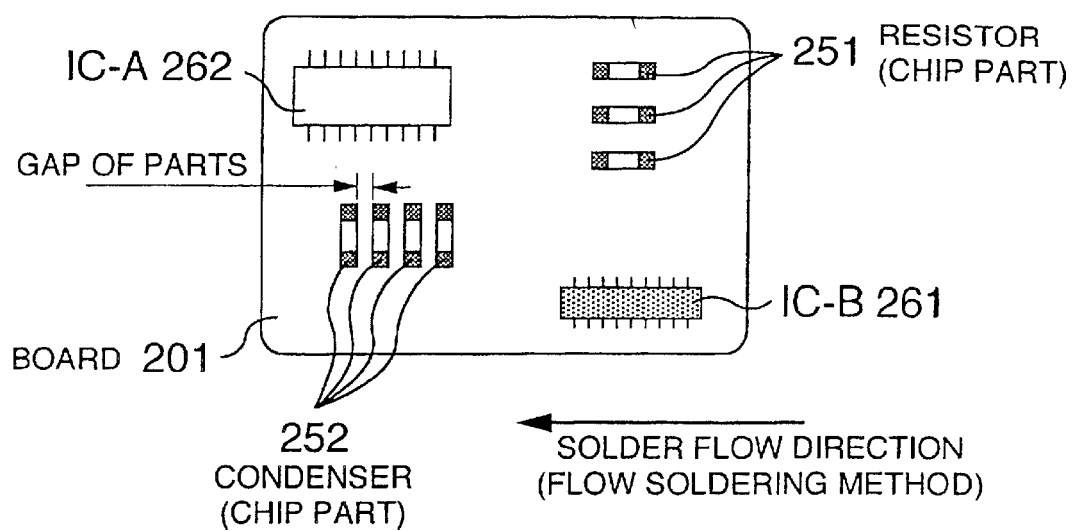
FIG. 4 is a diagram showing input design information of the present invention.
FIG. 5 is a diagram showing a board assembly configuration in an example of a system evaluation object of the present invention.

FIG. 4 shows the design information inputted in which structural features between parts or members included in the product such as size, an angle, weight, a contour, and a layout are described. In FIG. 4, there are described structural features in association with structural defective occurrence conditions shown in FIG. 3. This is because that the design information shown in FIG. 4 is evaluated in accordance with the defective information shown in FIG. 3.

Next, the structural conditions of each part of the evaluation objective product (between the parts or the members of the product to be evaluated) of the input information shown in FIG. 4 are evaluated by a calculation program stored in storage unit 4. This is achieved by executing subsequent processing for the structural conditions of each part of the product to be evaluated. For each structural condition which may cause the defectives shown in FIG. 3, a check is made to determine whether or not the condition matches with that of the part to thereby determine whether or not the structural condition leads to occurrence of the defective. If the occurrence is determined, a calculation is conducted to obtain an estimated value of defective ratio for the possible defective event and then the defective event and the estimated value of defective ratio are stored (step 120).

The calculation of the estimated value of defective ratio is conducted, for example, as follows. For each defective event, a defective ratio coefficient is stored with a correspondence established therebetween such that a defective ratio of a product is calculated in accordance with a defective ratio coefficient of a defective event extracted.

Next, a defective ratio of the product is calculated by combining with each other the estimated values of defective ratio thus stored (step 130).

Finally, evaluation results calculated are outputted (step 140).

Due to the processing above, even when a plurality of types of defective events may occur for a product, since the evaluation is conducted in accordance with presence or absence of structural features causing the defective events, it is possible to provide highly reliable evaluation results fully including the plural types of defective events. Additionally, since the evaluation results are also equivalent to extraction of a design structure which causes the defective event, it becomes easier to extract design modification points.

Description will now be more specifically given of the processing of the system using an example of a board assembly product shown in FIG. 5. In this explanation, a printed-circuit board assembly (to be simply referred to as "board assembly" or "board ass'y" herebelow) includes a printed board (to be simply referred to as "board" herebelow) including a place made of a paper phenol resin or a glass epoxy resin and wirings printed thereon and electronic parts and electric parts mounted thereof, the mounted items being soldered onto the board.

FIG. 5 shows an example in which four kinds of parts, i.e., an IC-A 262, a resistor (chip part) 251, a condenser (chip part) 252, and an IC-B 261 are mounted on a board 201 such that these mounted items are installed in a flow soldering method. In the operation, the solder flows in a direction indicated by an arrow shown in FIG. 5.

First, description will be given of input of design information regarding a product to be evaluated.

The design of a board assembly is generally carried out by a CAD system. Therefore, in this description, it is assumed that design information of the board assembly is acquired from a CAD system via a computer network. That is, the information is attained from the two-dimensional or three-dimensional CAD system in design system 20 shown in FIG. 1. As a method to acquire design information, it is efficient to select information necessary for the defective ratio evaluation from design information (CAD data and specification information of parts) of the board assembly stored in the CAD system.

When design information necessary for the defective ratio evaluation is insufficient in the CAD system, it is only necessary to employ a configuration in which the necessary design information is stored in a storage unit of evaluation system 10 and design system 20 in accordance with information (such as part IDs) included in the CAD data to identify mount parts and boards used. The necessary information is retrieved and is read therefrom when required.

In this connection, the information may be inputted to the system via a recording media such as a floppy disk. Moreover, the information may be inputted from input unit 1 such as a keyboard.

FIGS. 6A and 6B show an example of input information necessary to evaluate the board assembly shown in FIG. 5.

In this example, the input information includes structural features in each junction between board 201 and mounted parts 251, 252, 261, and 262. For example, for a junction 1 of FIG. 6B which is a place where the board is connected to resistor (chip part) 251, a position thereof on board 201, a junction contour (a land contour, a hole contour, etc.) on the board side, and a mounted part contour (a lead contour, a lead pitch, etc.) are stipulated as input information. Moreover, the input information also includes a soldering method and a solder flow direction in the mounting of mount parts on the board (FIG. 6A). These design information items are required to identify defective events which occur in the board assembly.

Next, for each junction of the board assembly stipulated by the input information, a check is made to determine whether or not a defective occurrence condition (defective information) regarding the facility, the method, and the structural features shown in FIG. 7 is satisfied. For example, the determination is conducted according to the processing flow shown in FIG. 8. This processing flow determines whether or not a defective event "insufficient solder" described in FIG. 7 is satisfied. Consequently, although not shown, a processing flow is prepared in this system for each defective event stipulated in FIG. 7. In this regard, for a plurality of types of defective events, there are described in FIG. 7 the conditions which may cause occurrence of the events and defective ratio coefficients associated therewith. The defective information shown in FIG. 7 is beforehand stored in storage unit 4.

The defective information is stored as a table in a storage unit 4, the table including a code field to indicate the contents of an associated defective event, a code field disposed in association with each defective event item to indicate an occurrence condition of the defective event, and a code field to indicate a defective ratio coefficient.

The table of FIG. 7 indicating a relationship between the defective events and the defective information may be stored on various recording media to be supplied to users. For example, the table may be recorded on an optical disk, a magnetic disk, a magnetooptical disk, or a semiconductor memory.

Description will be given in detail of the processing flow of FIG. 8.

The flow of FIG. 8 shows part of step 120 of FIG. 2. In this processing, a check is made to determined whether or not a defective event possibly occurs in a particular section to acquire a defective ratio and to store the ratio.

When the flow of FIG. 8 is executed for all defective events and for each part, step 120 is completed.

First, it is determined whether or not a defective event "insufficient solder" stipulated in FIG. 7 occurs in junction 1. The calculation program reads defective occurrence conditions (conditions regarding facilities and production methods and structural features) which may cause "insufficient solder (flow soldering, chip part)" and compares the conditions with design information of junction 1 for the determination.

The determination is conducted in accordance with the processing flow of FIG. 8 described above.

The processing flow will be next described.

First, whether or not the defective event of "insufficient solder" occurs is determined in steps 800 to 830.

It is first determined whether or not the mount item to be evaluated is a chip part (step 800). This is accomplished by achieving a comparison with data "mounted part type" of information regarding the junction in the CAD data. If it is determined that the part is a chip part in step 800, process further goes to step 810 to execute subsequent determination. On the other hand, if it is determined that the part is other than a chip part, it is assumed that there exists no chance of occurrence of "insufficient solder (flow soldering, chip part)" for the mount part and then the evaluation processing of the "insufficient solder (flow soldering, chip part)" for the mount part is terminated.

If it is determined in step 800 that the part is a chip part, whether or not the soldering is a flow soldering is judged (step 810). This is conducted through a comparison with data of "soldering method" of information regarding the board in the CAD data. If it is determined that the soldering is the flow soldering, process further goes to step 820 to conduct next determination. On the other hand, if it is determined that the soldering is other than the flow soldering, it is assumed that there exists no chance of occurrence of "insufficient solder (flow soldering, chip part)" for the mount part and then the evaluation processing of "insufficient solder (flow soldering, chip part)" for the mount part is terminated.

If it is determined in step 810 that the soldering is the flow soldering, process further goes to step 820 to judge whether or not the solder flow direction matches the part mount direction (step 820). This is achieved by judging whether or not "solder flow direction" of information related to the board in CAD data matches the direction of "land pitch" of information regarding the junction. If it is determined in step 820 that the solder flow direction matches the part mount direction, it is assumed that "insufficient solder (flow soldering, chip part)" may occur for the mount part (step 830). On the other hand, if it is determined that the solder flow direction does not match the part mount direction, it is assumed that there exists no chance for occurrence of "insufficient solder (flow soldering, chip part)" for the mount part, and then the evaluation processing of "insufficient solder (flow soldering, chip part)" for the mount part is terminated.

If it is assumed in step 830 that "insufficient solder (flow soldering, chip part)" may occur, an estimated defective ratio thereof is then calculated (step 840). In this operation, a defective ratio coefficient of "insufficient solder (flow soldering, chip part)" is read from its storage and the coefficient is calculated using the coefficient in accordance with an estimated defective ratio calculation formula stored in the calculation program.

Subsequently, the defective ratio coefficient and the estimated defective ratio thus calculated and the defective event are temporarily stored as the evaluation results of the mount part to be evaluated (step 850).

In the embodiment, since junction 1 completely satisfies the structural conditions stipulated for "defective event: insufficient solder" shown in FIG. 7, namely, "flow soldering", "mount part: chip", and "solder flow direction matching", it is determined that "insufficient solder (flow soldering, chip part)" occurs in junction 1. A defective event name (or information such as a code to identify the defective event) and the defective ratio coefficient are then temporarily stored in RAM 33 or storage unit 4 (steps 840 and 850). In this situation, the defective ratio coefficient is "150 ppm" as shown in FIG. 7.

The processing above is executed for all defective events to determine defective events associated with junction 1. Moreover, the processing above is conducted for all junctions.

As a result, there are calculated the types and the number of types of the defective events (including the defective ratio coefficients corresponding thereto) pertinent to the board assembly to be evaluated.

The calculation program thus completes judgement and calculation for the board assembly and finally outputs results of calculation to output unit 2.

FIG. 9 shows an example of an output screen of a first embodiment of a system in accordance with the present invention.

The system of the present invention has an aspect that an estimated defective event and an estimated defective ratio thereof can be calculated for each part or member included in a product to be evaluated. By combining with each other the estimated defective ratios of the respective parts or members, it is also possible to calculate an estimated defective ratio of the entire product. Therefore, a system output screen of the present invention includes an aspect to provide an area 310 to display the evaluation results of the entire product and an area 320 to display the evaluation results of each part of the product.

FIG. 9 is an output example in which the evaluation results are displayed for the respective parts in a lower section. The output items for each part include a total of estimated evaluation ratios of the product 331 and individual ratios for respective events 332.

The evaluation results outputted for respective parts are used to recognize "which part has a high defective ratio and which defective event occurs". This is necessary to efficiently correct the design and the work. When the output items are sorted in a descending order of estimated defective ratios and the sorted results are displayed, the design and the work can be efficiently achieved.

In an upper section, there are displayed an estimated defective ratio 311 of the entire product, namely, product "main broad assembly" of FIG. 5 and individual ratios of respective events thereof 312. In this situation, the estimated defective ratio 311 of the entire product is calculated using a predetermined function and the types and the number of the defective events (including the defective ratio coefficients corresponding thereto) pertinent to the board assembly to be evaluated. For example, there may be employed a configuration in which the defective ratio coefficients calculated for the respective junctions are simply added to each other. The displayed contents of the estimated defective ratio of the entire product and the estimated defective ratios of the respective defective events can be utilized to recognize a height of the design level of the product and a tendency of possible defective events.

Moreover, this system has a second aspect that an area 350 is disposed to visually display conditions of structure and manufacturing of the product to be evaluated such that a part for which a chance of occurrence of a defect is assumed can be visually identified as shown in FIG. 9. This facilitates reliable correction work at a high speed.

Additionally, for fields of sections and parts for which a higher value of estimated defective ratio is evaluated by the system, when the color is changed or the display is blinked for better perception of the fields in the displayed image, the sections and parts with high defective potential can be easily recognized, and hence an appropriate work instruction can be issued at a high speed.

In addition thereto, the system has a third aspect in which for a part for which a chance of occurrence of a defect is determined, there is also given a helpful advice (items to be corrected to lower the defective ratio, for example, a design specification or a manufacture specification).

Thanks to the processing above, even when a plurality of types of defective events occur for a product, since the evaluation is processed in accordance with presence or absence of structural features causing the defective events, it is possible to provide highly reliable evaluation results entirely involving the plural types of defective events. Since the design structure is quite highly related to the defective events particularly for the soldering operation, the evaluation of this system has high reliability. Additionally, the evaluation results are equivalent to extraction of a design structure causing defective events, the design change positions can be easily extracted.

Furthermore, thanks to the output information from the system of the present invention, the design and development divisions can quantitatively recognize positions requiring correction in the structure of the product and the defective occurrence frequency for the positions and hence can effectively and efficiently correct the design. This leads to an advantage of prevention of occurrence of defectives. In addition, the manufacturing division can beforehand recognize positions at which defects may occur and the occurrence frequency thereof and hence can draft a work plan, a process schedule, and an inspection plan in consideration thereof, which also leads to an advantage of prevention of defective occurrences. As above, in accordance with the present invention, the design, manufacturing, and quality guaranteeing divisions can respectively and appropriately prevent occurrence of defectives. In the manufacturing, since the parts, positions, and work for which an emphasized work control and an emphasized quality control are required can be known from the output information of this system, an appropriate work instruction, an appropriate inspection process allocation, and an appropriate inspection method selection become possible. Consequently, the present invention is quite effective not only for the prevention of defective occurrences but also for detection of defectives.

As described above, the defects occurring in the manufacturing process and those taking place in the market can be remarkably decreased. That is, reliability of the products to be delivered can be effectively increased.

In this connection, also in the maintenance service after the delivery of the product, the positions to be mainly inspected can be recognized in accordance with the evaluation results of the system, which is also effective to retain operating quality of the product after the deliver thereof.

Next, description will be given of another embodiment of the present invention using an example in which a product including welded structure is to be evaluated.

Welding is a method of combining metallic materials with each other, namely, a method of metallurgically combining different materials with each other. The welding is primarily classified into fusion welding, pressure welding, and blazing. This embodiment will be described by referring to an example of fusion welding most broadly used. Fusion welding is a method in which only junctions of metal to be combined with each other or the junctions and a filler material are heated to be molten by electromagnetic energy (arc heat and the like) or chemical reaction energy (gas flame or the like) and are then solidified. Representative welding methods are gas welding, plasma welding, and laser welding. In the welding work, when a design specification of a product to be welded is determined, a facility, a jig, and a tool; a welding method, and a method and contents of work are determined. Furthermore, according to the method and contents of work, difficulty of the work is determined, which considerably influences reliability of the welding work. It has been known from experiences that work defectives in the welding are caused by a design structure of a product to be welded in many cases as described above.

Under the condition, this embodiment will be described by referring to an example in which easiness of occurrence of welding work defectives is evaluated for a product including welded structure.

Figure 10A:
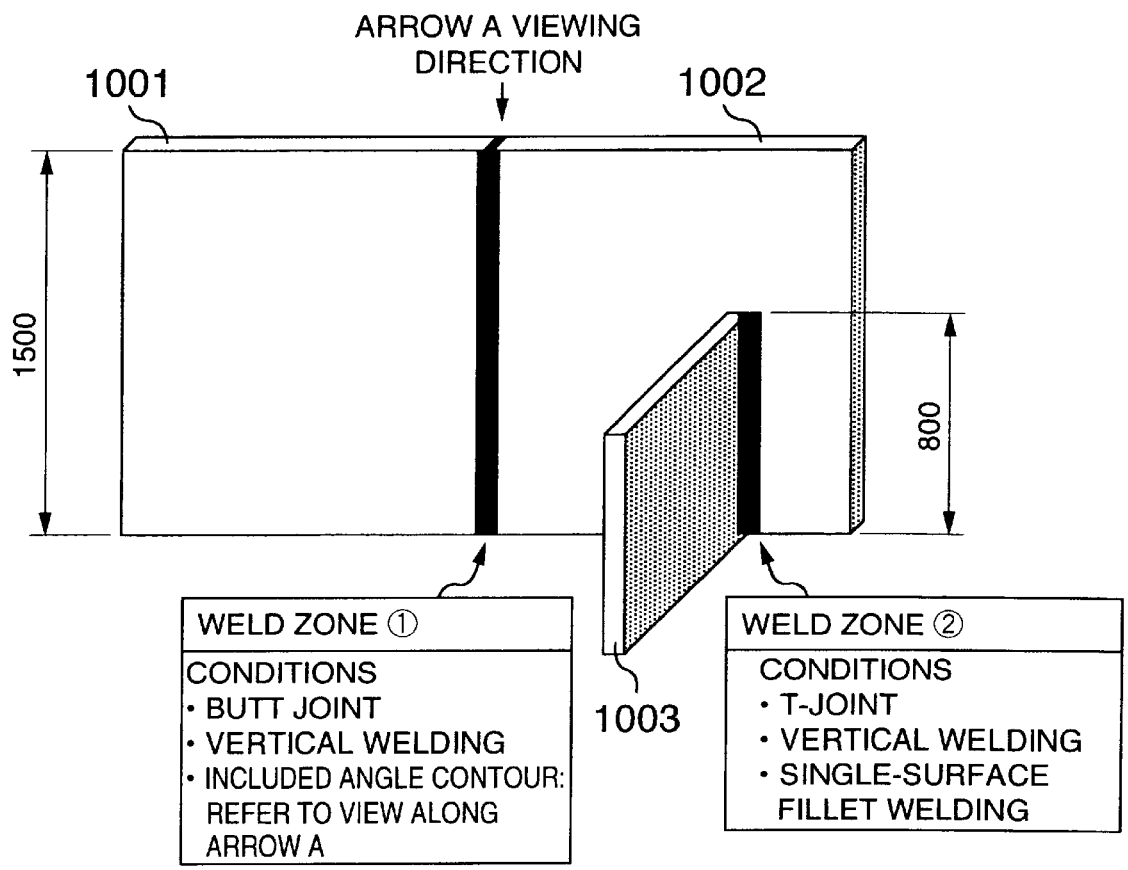
FIGS. 10A and 10B are diagrams showing an evaluation objective product in the system of the present invention.
Figure 10B:
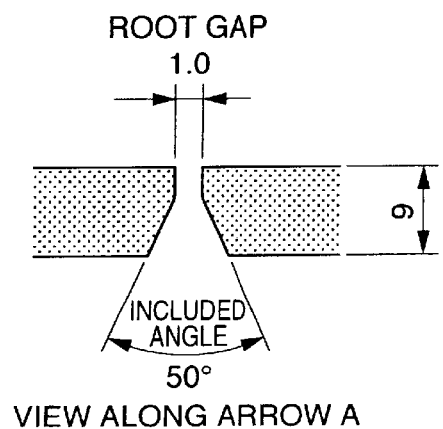

FIG. 10A shows an example including two welding positions. The positions are a weld zone 1 where butt welding is conducted between planar mother metals each having a height of 1500 mm and a weld zone 2 where fillet welding is carried out between an 800 mm high planar mother metal 1003 and planar metal 1002. The structural conditions of weld zone 1 are "butt" for the joint type, "V shape" for the weld type, "vertical" for the welding position, and the included angle contour shown in a view along arrow A in FIG. 10B, namely, the mother metal is 9 mm thick, the included angle is 50°, and the root gap is 1 mm. For weld zone 2, the joint type is "T-joint", the welding type is "fillet", and the welding position is "vertical".

FIGS. 11A and 11B show an example of input information for a product including welding structure shown in FIG. 10. FIG. 11A shows information of the entire product and FIG. 11B shows information of each welding location of the product.

In the description, structural features in respective weld zones between members 1001 to 1003 are used as input information. For example, for weld zone 1 which is a combining zone between members 1001 and 1002, welding positions (information identifying the positions), welding part numbers (numbers identifying parts to be welded), a joint type, a welding type, a welding position, an included angle contour (an included angle, a root gap), welding range (welding length), a caliber (for a piping part), and plate thickness are stipulated as input information.

Subsequently, FIG. 12A shows defective information stipulating a plurality of types of defective events regarding to a coated arc welding method and structural conditions causing the detectives. The defective information is beforehand stored in storage unit 4 as in the case of FIG. 7. However, the code field of the defective information includes an address to refer to a table of another defective information.

As shown in FIG. 12A, structural features which become defective occurrence conditions are stored for each defective event such as "slag inclusion" or "incomplete penetration" in the welding work, and a defective ratio coefficient value indicating a defective occurrence frequency when a condition of the defective occurrence is satisfied or a calculation formula for the defective ratio coefficient value is stored. Each field of a small circle "O" indicates a case for which a defective occurrence condition is satisfied. In this diagram, for example, "incomplete penetration" of No. 2, the defective ratio coefficient is stored as 300 ppm when the joint type is "T-joint", the welding type is "fillet", and the welding position is "vertical". In this connection, when a plurality of conditions of design and structural features which become occurrence factors exist also for one defective event, there are stored, for each of the conditions, contents of the condition and a defective ratio coefficient value when the defective occurrence condition is satisfied or a calculation formula for the defective ratio coefficient value. Description will be given, for example, of an example of a defective event of "slag inclusion" of No. 1. Conditions easily causing the defective of "slag inclusion" are "butt" for the joint type, "V shape" for the welding type, "vertical" for the welding position, and an included angle of "60° or less" and a root gap stored in a separate table at address B for the included angle contour. At address B specified, root gap conditions easily causing the slag inclusion are stored for respective plate thicknesses of the mother metal as shown in FIG. 12B. Additionally, in place of a defective ratio coefficient, a defective ratio coefficient calculation formula is stored in this example as shown below. In this regard, g1 ( ) represents a function.

$$\text{Defective ratio coefficient of "slag inclusion"} = \text{constant } K \times \text{root gap/plate thickness} \quad (1)$$

As above, the defective ratio coefficient calculation formula is stored when the defective ratio coefficient changes with respect to magnitude of characteristic values indicating structural features. When it is determined that design and structural features of the welding work sections to be evaluated are associate with a defective occurrence condition, the calculation program assigns the value of mother metal plate thickness and the value of root gap of the input information in the defective ratio coefficient calculation formula to calculate a defective ratio.

When information regarding a product to be evaluated is next inputted as indicated in FIGS. 11A and 11B, a check is made for each welding location of the evaluation objective product to determine whether or not defective occurrence conditions stored in storage unit 4 as shown in FIG. 12 are satisfied. This is judged, for example, in accordance with a processing flow shown in FIG. 13. This processing flow stipulates whether or not a defective event described in FIG. 12A is satisfied. Therefore, although not shown, a processing flow is prepared for each defective event also in this embodiment.

The calculation program first determines that a welding method common to the products is "coated arc welding" in accordance with the input information including information "coated arc welding" for the welding method and then retrieves, from storage unit 4, data for the coated arc welding shown in FIG. 12A.

Thereafter, using the data for the coated arc welding shown in FIG. 12A, a check is first made to determine whether or not "slag inclusion" occurs in the welding work of weld zone 1. The calculation program reads structural conditions possibly causing "slag inclusion" and compares the conditions with information regarding weld zone 1 to be evaluated.

Figure 13:
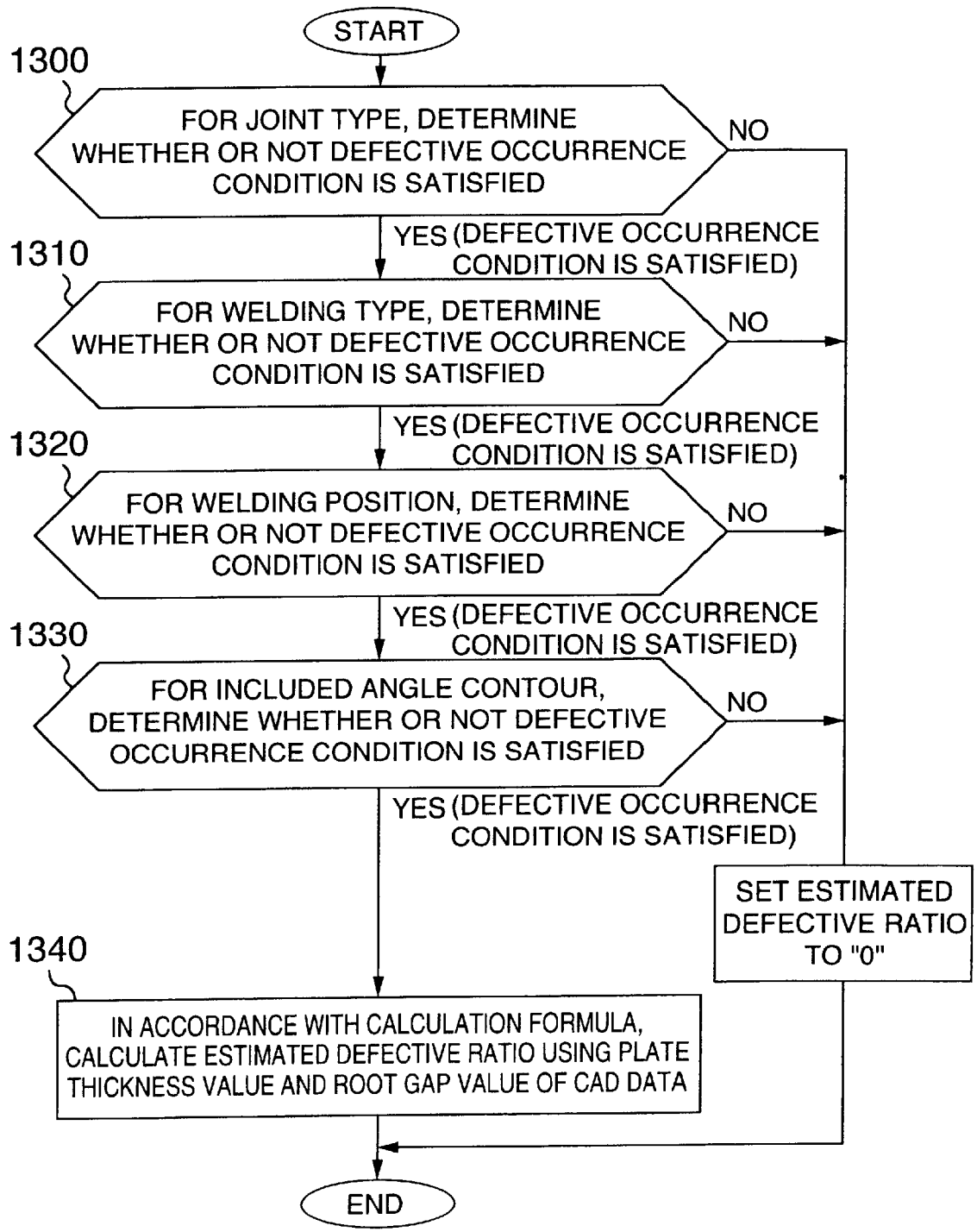
FIG. 13 is a flowchart showing a processing flow in the system of the present invention.

The decision processing is as shown in the processing flow of FIG. 13 described above in which the program executes steps 1300 to 1330 to determine whether or not the conditions causing the defective event "slag inclusion" are satisfied.

In this embodiment, the joint type, the welding type, and the welding position entirely satisfy the conditions. Moreover, for the condition an included angle of "60° or less" of the included angle shape stored in the defective ratio coefficient storage, 50° is specified for weld zone 1, and hence the condition is satisfied. Additionally, the root gap is 1.0 mm for weld zone 1 and the condition stored at address B of the defective ratio coefficient storage is "root gap is 1.4 or less for plate thickness of 9 mm", and the condition is therefore satisfied. Consequently, since the conditions possibly causing "slag inclusion" are completely satisfied in weld zone 1, the calculation program determines that "slag inclusion" may occur in weld zone 1 and then calculates a defective ratio coefficient of "slag inclusion" in weld zone 1 using the defective ratio coefficient calculation formula (1) and a plate thickness value and a root gap value in the input information. The program then temporarily stores the defective event name (or information such as a code to identify the defective event), the defective ratio coefficient, and the evaluated defective ratio in RAM 33 or storage unit 4 (step 1340).

The processing above is executed for all defective events of FIG. 12A to determine defective events associated with weld zone 1. Moreover, the processing above is conducted for all weld zones.

As a result, there are calculated the types and the number of the defective events (including the defective ratio coefficients corresponding thereto) pertinent to the welded products to be evaluated.

The calculation program thus completes judgement and calculation for the respective weld zones of the evaluation objective products shown in FIG. 10A and finally outputs results of calculation to output unit 2.

FIG. 14 shows an example of an output screen of a second embodiment of a system in accordance with the present invention.

As already described in the embodiment above, the output screen of the system of the present invention has an aspect to include an area to output evaluation results of the entire product, an area to output evaluation results of respective parts of the product, and an area to visually display the structure and manufacturing conditions of the product to be manufactured so as to indicate parts for which a chance of defective occurrence is determined.

In the output example of FIG. 14, a display area 530 is allocated to a lower section thereof to display evaluation results of respective weld zones. An output information field 531 for each weld zone includes an estimated defective event display field 531*a*, a defective ratio coefficient display field 531*b*, and an estimated defective ratio display field 531*b*. In this connection, the design information of the pertinent weld zone is also displayed in an information display field 532 in the output example of FIG. 14. Since the design information is also displayed together with the evaluation results of the evaluation objective weld zone, the causal relationship can be easily recognized, which advantageously helps efficiently correct the design and the work.

Incidentally, even when the design information includes a large number of items and it is impossible to display all items in a displayable area of the output device such as a display monitor, the example of FIG. 14 can cope with this condition by providing a horizontal scroll bar 533 to view the design information display field for each weld zone.

Additionally, since the example of FIG. 14 includes two weld zones, there is not shown a case in which due to a large number of weld zones, the evaluation results and the like of all weld zones cannot be displayed in the vertical display range. In such a situation, a vertical scroll bar is displayed to view the evaluation results of all weld zones.

Furthermore, the evaluation results of the entire product, namely, product "screen" of FIG. 10 are displayed in an upper section of FIG. 14. The estimated defective ratio of the entire product is displayed in an estimated defective ratio display field of product 511 and individual ratios of respective events thereof are displayed in a field 512. The estimated defective ratio of the entire product and the individual estimated defective ratios of respective events thereof thus displayed can be used to recognize a height of the product design level and a tendency of possible defective events.

Moreover, in addition to the product name and number, there is displayed fundamental information of the evaluation objective product, namely, a name (or information identifying a work place) of a work place (a place where the work is achieved) and a welding method name (or information identifying a welding method name) for the following reasons. The information is necessary to make a plan for efficient and appropriate correction of the design and the work and hence is desirably displayed together with the evaluation results.

Additionally, the example of FIG. 14 also includes an area 550 to visually display structural and manufacturing conditions of the objective product such that parts for which possible defectives are determined are visually known to enable the correcting work to be reliably achieved at a high speed.

Thanks to the processing above, even when a plurality of types of defective events occur for a product, since the evaluation is processed in accordance with presence or absence of structural features causing the defective events, it is possible to provide highly reliable evaluation results entirely involving the plural types of defective events. Since the design structure is quite highly related to the defective events particularly for the welding operation, the evaluation of this system has high reliability. Additionally, since the evaluation results are equivalent to extraction of a design structure causing defective events, the design change positions can be easily extracted.

Due to the output information from the system of the present invention, the design and development divisions can quantitatively recognize positions requiring correction in the structure of the product and the defective occurrence frequency for the positions and hence can effectively and efficiently correct the design. This leads to an advantage of prevention of occurrence of defectives. In addition, the manufacturing division can beforehand recognize positions at which defects may occur and the occurrence frequency thereof and hence can draft a work plan, a process schedule, and an inspection plan in consideration thereof. This also leads to an advantage of prevention of defective occurrences. As above, in accordance with the present invention, the design, manufacturing, and quality guaranteeing divisions can respectively and appropriately prevent occurrence of defectives. In the manufacturing, since the parts, positions, and work for which an emphasized work control and an emphasized quality control are required can be known from the output information of this system, an appropriate work instruction, an appropriate inspection process allocation, and an appropriate inspection method selection become possible. Consequently, this is quite effective not only for the prevention of defective occurrences but also for detection of defectives. As described above, the defects occurring in the manufacturing process and those taking place in the market can be remarkably decreased. That is, reliability of the products to be delivered can be effectively increased.

In this connection, also in the maintenance service after the delivery of the product, the positions to be mainly inspected can be recognized in accordance with the evaluation results of the system. This is also effective for the maintenance of operating quality of the product after the deliver thereof.

Although the evaluation object is a product is a product in the description of the embodiments above, the evaluation object of the system of the present invention is not limited to products but may be a half-finished products and parts.

Moreover, the manufacturing defective ratio is an object of evaluation in the description of the embodiments above. However, main factors of general defectives (design defects) are structural factors of the product, and hence it is to be appreciated that the present invention is also applicable to general product defectives (design defects) other than the manufacturing defectives.

In addition, the input information need not be items for junctions and weld zones, namely, it is also possible without any problem to provide information necessary for each part of the product.

When the calculation program and defective information of the present invention are recorded on a recording media and the media is distributed to users, it is possible for the users in a board area to easily use a system of the present invention in respective environments.

Figure 15:
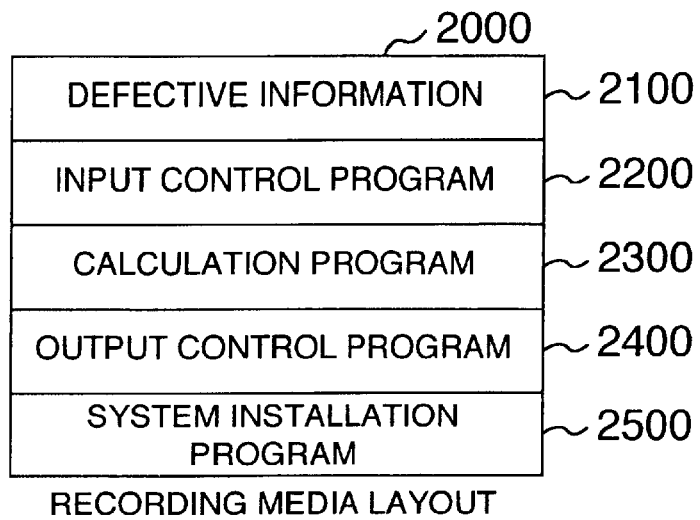
FIG. 15 is a diagram showing an example of a recording media on which a program of the present invention is recorded.

FIG. 15 shows an example of a recording media layout in which the calculation program and defective information of the present invention are recorded. The recording media on which the calculation program and defective information of the present invention are recorded includes defective information for each defective event 210, an input control program 2200, a calculation program 2300, an output control program 2400, and a system installation program 2500. The defective information 2100 includes data, for example, as shown in FIGS. 7, 12A, and 12B.

In this connection, to evaluate a plurality of types of products, there are further required defective information for each defective event, an input control program, a calculation program, and an output control program for each type of products. However, the input control program, the calculation program, and the output control program may be shared among a plurality of types of products depending on cases.

Figure 16:
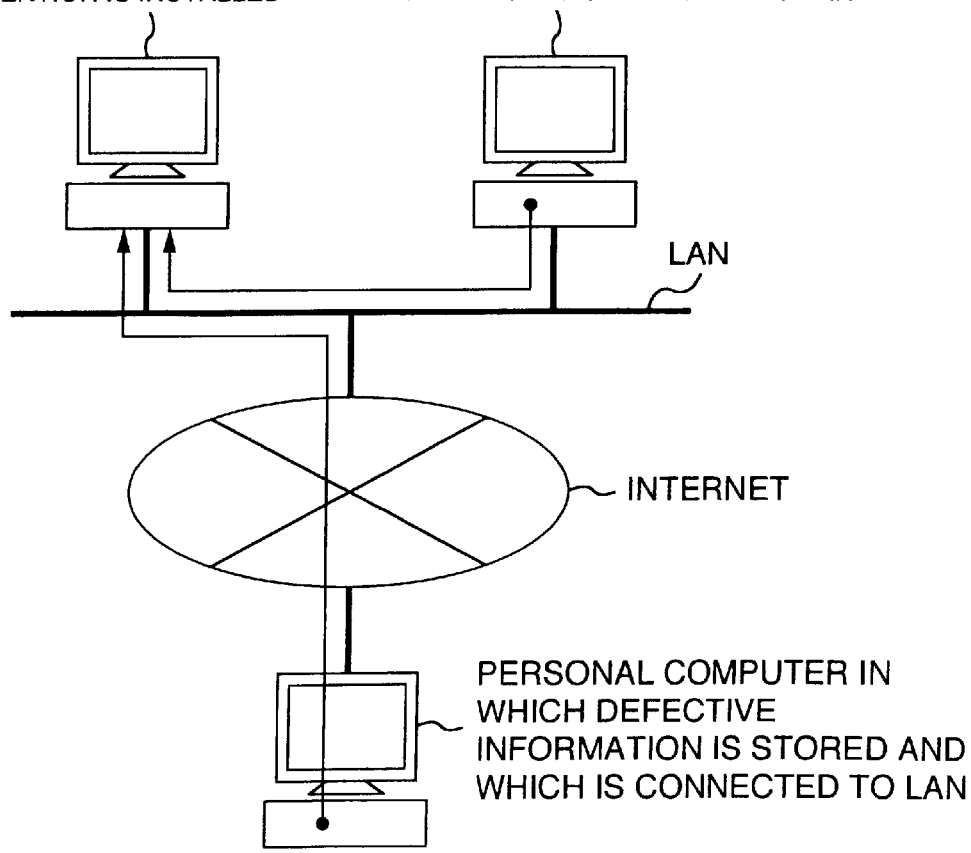
FIG. 16 is a diagram showing an example of a system configuration when defective information is acquired via the internet.

Furthermore, the defective information need not be necessarily recorded on the same recording media. As shown in FIG. 16, the defective information may be acquired via the internet or may exist in another file storage location (in a location of a storage unit of a personal computer in which the system of the present invention is installed or in a storage unit of a personal computer connected to a local area network).

To receive the defective information via the internet, the defective information including description of conditions for occurrence of defective events is made accessible via the internet in step 100 of FIG. 2. For this purpose, the defective information may be downloaded onto an RAM. Alternatively, a provider of defective information may be accessed when necessary to set the defective information to an accessible state. Steps 110 to 140 can also be used in this situation without any modification.

In the system above, the defective information is updated to the latest information in any case. Consequently, the system can always achieve the evaluation processing in accordance with the latest defective information.

Next, to use the defective information in another file storage location (in a location of a storage unit of a personal computer in which the system of the present invention is installed or in a storage unit of a personal computer connected to a local area network), the file storage location of the defective information is specified and is set to be accessible in step 100 of FIG. 2. For this purpose, the defective information may be entirely read out to be downloaded onto an RAM or the file containing the defective information may be set to an accessible state when necessary. Steps 110 to 140 can also be used in this situation without any modification.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A defective ratio evaluation method of a product, comprising the steps of:

storing defective information of a plurality of types of defective events corresponding to structural features of a product, manufacturing features comprising at least structural features between parts or members included in the product which become product defective occurrence factors and defective ratio coefficients corresponding to said defective events, and making the defective information accessible;

comparing input design information of a product to be evaluated with the defective information and computing types of defective information and a number of defective information items included in the design information, the design information describing structural features between parts and members included in the product and manufacturing features;

computing, before beginning manufacture of the product to be evaluated and using the types of defective information and the number of defective information items thus computed, types of defective events estimated for each part of the product, and a degree of occurrence of an event in which the product to be evaluated becomes defective; and displaying the degree of defective occurrence thus computed and the types of the defective events estimated for each part of the product.

2. A defective ratio evaluation method according to claim 1, wherein the step of computing the degree of defective occurrence includes:

computing, for each part of the product, a degree of occurrence of an event in which the part becomes defective; and computing, for the entire product, a degree of occurrence of an event in which the product becomes defective.

3. A defective ratio evaluation method according to claim 2, wherein the step of displaying the degree of defective occurrence includes:

displaying evaluation results for the entire product; and displaying evaluation results for each part of the product.

4. A defective ratio evaluation method according to claim 3, wherein the step of displaying the degree of defective occurrence includes changing a display method in accordance with a value of the defective ratio estimated.

5. A defective ratio evaluation method according to claim 2, wherein the step of displaying the degree of defective occurrence includes displaying a section for which a chance of defective occurrence is determined, the section being visually emphasized.

6. A defective ratio evaluation method according to claim 5, wherein the step of displaying the degree of defective occurrence includes displaying, for a section for which a chance of defective occurrence is determined, an item to be corrected to lower the defective ratio.

7. A defective ratio evaluation method according to claim 1, wherein the step of making the defective information accessible includes storing the defective information in a memory.

8. A defective ratio evaluation method according to claim 1, wherein the step of making the defective information accessible includes accessing defective information provided in an external device.

9. A computer-readable recording medium comprising instructions that, when executed by a computer system, performs a defective ratio evaluation method of a product, comprising:

storing defective information of a plurality of types of defective events corresponding to structural features of a product, manufacturing features comprising at least structural features between parts or members included in the product which become product defective occurrence factors and defective ratio coefficients corresponding to said defective events, and making the defective information accessible;

comparing input design information of a product to be evaluated with the defective information and computing types of defective information and a number of defective information items included in the design information, the design information describing structural features between parts and members included in the product and manufacturing features;

computing, before beginning manufacture of the product to be evaluated and using the types of defective information and the number of defective information items thus computed, types of defective events estimated for each part of the product, and a degree of occurrence of an event in which the product to be evaluated becomes defective; and displaying the degree of defective occurrence thus computed and the types of the defective events estimated for each part of the product.

10. A computer-readable recording medium according to claim 9, wherein the step of computing the degree of defective occurrence includes:

computing, for each part of the product, a degree of occurrence of an event in which the part becomes defective; and computing, for the entire product, a degree of occurrence of an event in which the product becomes defective.

11. A computer-readable recording medium according to claim 10, wherein the step of displaying the degree of defective occurrence includes:

displaying evaluation results for the entire product; and displaying evaluation results for each part of the product.

12. A computer-readable recording medium according to claim 11, wherein the step of displaying the degree of defective occurrence includes changing a display method in accordance with a value of the defective ratio estimated.

13. A computer-readable recording medium according to claim 10, wherein the step of displaying the degree of defective occurrence includes displaying a section for which a chance of defective occurrence is determined, the section being visually emphasized.

14. A computer-readable recording medium according to claim 13, wherein the step of displaying the degree of defective occurrence includes displaying, for a section for which a chance of defective occurrence is determined, an item to be corrected to lower the defective ratio.

15. A computer-readable recording medium according to claim 9, wherein the step of making the defective information accessible includes accessing defective information provided in an external device.

16. A defective ratio evaluation system of a product, comprising:

means for storing defective information of a plurality of types of defective events corresponding to structural features of a product, manufacturing features comprising at least structural features between parts or members included in the product which become product defective occurrence factors and defective ratio coefficients corresponding to said defective events, and making the defective information accessible;

means for inputting design information of a product to be evaluated, the design information describing structural features between parts and members included in the product and manufacturing features;

means for comparing the design information of the product to be evaluated with the defective information, for computing types of defective information and a number of defective information items included in the design information, and for computing, before beginning manufacture of the product to be evaluated and using the types of defective information and the number of defective information items thus computed, types of defective events estimated for each part of the product, and a degree of occurrence of an event in which the product to be evaluated becomes defective; and means for displaying the degree of defective occurrence thus computed and the types of the defective events estimated for each part of the product.

17. A defective ratio evaluation system according to claim 16, wherein the means for computing the degree of defective occurrence includes computing, for each part of the product, a degree of occurrence of an event in which the part becomes defective; and computing, for the entire product, a degree of occurrence of an event in which the product becomes defective.

18. A defective ratio evaluation system according to claim 17, wherein the means for displaying the degree of defective occurrence includes displaying evaluation results for the entire product; and displaying evaluation results for each part of the product.

19. A defective ratio evaluation system according to claim 18, wherein the means for displaying the degree of defective occurrence includes changing a display method in accordance with a value of the defective ratio estimated.

20. A defective ratio evaluation system according to claim 17, wherein the means for displaying the degree of defective occurrence includes displaying a section for which a chance of defective occurrence is determined, the section being visually emphasized.

21. A defective ratio evaluation system according to claim 20, wherein the means for displaying the degree of defective occurrence includes displaying, for a section for which a chance of defective occurrence is determined, an item to be corrected to lower the defective ratio.

22. A defective ratio evaluation system according to claim 16, wherein the means for making the defective information accessible includes storing the defective information in a memory.

23. A defective ratio evaluation system according to claim 16, wherein the means for making the defective information accessible includes accessing defective information provided in an external device.

* * * * *